United States Patent
Li et al.

(10) Patent No.: US 10,715,853 B2
(45) Date of Patent: Jul. 14, 2020

(54) PERSON LEVEL VIEWERSHIP PROBABILISTIC ASSIGNMENT MODEL WITH MARKOV CHAIN

(71) Applicant: comScore, Inc., Reston, VA (US)

(72) Inventors: Ying Li, Falls Church, VA (US); Pakawat Phalitnonkiat, Vienna, VA (US); Frank E. Pecjak, Fairfax, VA (US)

(73) Assignee: Comscore, Inc., Reston, VA (US)

( * ) Notice: Subject to any disclaimer, the term of this patent is extended or adjusted under 35 U.S.C. 154(b) by 0 days.

(21) Appl. No.: 15/988,234

(22) Filed: May 24, 2018

(65) Prior Publication Data

US 2019/0364315 A1 Nov. 28, 2019

(51) Int. Cl.
| | |
|---|---|
| *H04N 7/025* | (2006.01) |
| *H04N 21/258* | (2011.01) |
| *H04N 21/466* | (2011.01) |
| *H04N 21/2668* | (2011.01) |

(52) U.S. Cl.
CPC ... *H04N 21/25883* (2013.01); *H04N 21/2668* (2013.01); *H04N 21/4667* (2013.01)

(58) Field of Classification Search
CPC ......... H04N 21/25883; H04N 21/2668; H04N 21/4667; H04N 21/44222
USPC ............................ 725/9, 10, 13, 34, 46, 11
See application file for complete search history.

(56) References Cited

U.S. PATENT DOCUMENTS

| | | | | |
|---|---|---|---|---|
| 2002/0129368 | A1* | 9/2002 | Schlack | G06Q 30/02 725/46 |
| 2012/0331494 | A1* | 12/2012 | Pontual | H04N 21/44222 725/9 |
| 2015/0026707 | A1* | 1/2015 | Lisovich | H04H 60/31 725/11 |

* cited by examiner

*Primary Examiner* — Jivka A Rabovianski
(74) *Attorney, Agent, or Firm* — BakerHostetler (57) ABSTRACT

Techniques for projecting person-level viewership from household-level tuning events are described. Initially, panelist viewing data are accessed and a plurality of state values based on the panelist viewing data are determined. Then, tuning data representing tuning events associated with particular households are accessed. For at least one tuning event represented by the tuning data, household member data is accessed, a portion of the panelist viewing data whose panelist information matches at least a portion of the member data is determined, a total number of watched minutes of the program by an individual member and a number of continuous series of watched states of the program by the individual member is determined, and an output representative of a probability that the particular portion of the program was watched by one or more of the individual members is generated.

18 Claims, 6 Drawing Sheets

PERSON LEVEL VIEWERSHIP PROBABILISTIC ASSIGNMENT MODEL WITH MARKOV CHAIN

TECHNICAL FIELD

The present disclosure generally relates to systems and methods for determining program viewership, and more particularly to systems and methods for determining the demographics of viewers of programs using a probabilistic minute by minute assignment model on the person level using a Markov Chain.

BACKGROUND

Television advertising relies on program and network viewership data in order to determine the expected reach of advertising slots. Advertisers are interested in numbers of viewers as well as the demographics of viewers in order to effectively manage television advertising timing and content. Understanding television audience viewing and habits may be useful in supporting planning, buying, and selling advertising.

SUMMARY

Techniques for projecting person-level viewership on a minute-by-minute basis from household-level tuning events are described. Initially, panelist viewing data are accessed and a plurality of state values based on the panelist viewing data are determined. Then, tuning data representing tuning events associated with particular households are accessed. For at least one tuning event represented by the tuning data, household member data is accessed, a portion of the panelist viewing data whose panelist information matches at least a portion of the member data is determined, a total number of watched minutes of the program by an individual member and a number of continuous series of watched states of the program by the individual member is determined, and an output representative of a probability that the particular portion of the program was watched by one or more of the individual members is generated.

For at least one tuning event represented by the tuning data, household member data identifying one or more individual members of a household associated with the tuning event may be accessed and a portion of the panelist viewing data whose panelist information matches at least a portion of the member data of the one or more individual members can be determined. In addition, for each of the individual members of the household, a total number of watched minutes of the program by the individual member and a number of continuous series of watched states of the program by the individual member can be determined. An output representative of a probability that the particular portion of the program was watched by one or more of the individual members can then be generated based on the total number of watched minutes and the number of continuous series of watched states of the program.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

Estimates of program viewership may be used by content providers, advertisers, and others to estimate the number of people that viewed a particular program, advertisement, sporting event, or other content item. The content may be viewed on a television (TV), tablet, mobile phone, or other electronic device. Viewership data can be collected at multiple levels. For example, person-level television viewership may be measured for a set of viewers, referred to as "panelists," who, in some cases, have agreed to have their viewing behavior monitored. For example, the measured viewership may be used for the purposes of producing viewing estimates. Each panelist may be associated with demographic information, such as, for example, the gender of the panelist, the age of the panelist, the income of the panelist, a geographic area in which the panelist lives, a size of the panelist's household, and other information.

In some cases, each panelist may be given a monitoring device to keep on their person, which monitors audio signals to determine if the panelist is watching a television program, and identifies the television program being watched. For example, the monitoring device may detect encoded signals within the television program audio identifying the television program. The monitoring device may also identify the television program from the detected audio by other mechanisms, such as, for example, by generating an acoustic fingerprint for the detected audio and consulting a database mapping acoustic fingerprints to television programs. Viewership data for the panelists, or "person-level data," may be collected from the monitoring devices (e.g., by transferring the data to an external server over a network such as the Internet), and may be further analyzed to determine statistics, trends, and other information regarding viewership of television programs. In some cases, the person-level data may be used to project viewership statistics for larger populations, such as the total number of viewers or viewing minutes for a television program for a particular demographic or a particular geographic area. However, collecting person-level data from panelists is logistically complex, and thus the sample size of the person-level data may be small, leading to a large margin of error in projections of viewership data for larger populations.

Television viewership can also be measured at the household level, such as, for example, by a set-top-box logging viewing activity. This "household-level data" may be easier to obtain for a large sample of viewers, but may not provide any information regarding which members of the household (if any) watched a particular television program. It may be difficult to accurately project individual viewership numbers (e.g., the number of unique individual viewers for the particular program) from this household-level data, which, as stated, may not include any information regarding which members of the household (if any) watched the particular television program.

Various techniques may be employed for projecting person-level viewership from household-level data. For example, panelist viewing data representing viewing events associated with one or more panelists may be accessed. Each viewing event in the panelist viewing data may include an identification of a program associated with the viewing event and a panelist minutes value representing a number of minutes a panelist was exposed to the program during the viewing event. Tuning data representing tuning events associated with particular households may also be accessed. Each tuning event in the tuning data may include an identification of a particular program associated with the tuning event and a household minutes value representing a number of minutes the particular program was played at a particular household in association with the tuning event. A plurality of state values may be determined based at least on the panelist viewing data, each of the state values corresponding to a particular portion of the program and representing whether the program was watched or not watched for the particular portion of the program by a given one of the panelists.

For at least one tuning event represented by the tuning data, household member data identifying one or more individual members of a household associated with the tuning event may be accessed, and a portion of the panelist viewing data whose panelist information matches at least a portion of the member data of the one or more individual members may be determined. In addition, for each of the individual members of the household, a total number of watched minutes of the program by the individual member and a number of continuous series of watched states of the program by the individual member may be determined. An output representative of a probability that the particular portion of the program was watched by one or more of the individual members may be generated based on the total number of watched minutes and the number of continuous series of watched states of the program.

Additional techniques to improve accuracy of the projections, such as weighting the person-level data to remove bias, may be performed, and are described in greater detail below. In addition, although the present disclosure generally describes the present techniques in the context of television viewership calculation, the techniques may be used to perform audience calculation for other types of content, including music, webpages, streaming video over the Internet, and other content.

Some or all of the techniques described may provide one or more advantages. For instance, by performing audience projections based on the person-level data and the household-level data, the relative shortcomings of both data sets (e.g., small sample size and lack of specific viewer information, respectively) may be mitigated. Further, the techniques described herein may allow for the integration of person-level data and household-level data from multiple sources into the same model, which may lead to further improvements in projection accuracy. For example, the model may be used to determine viewing probabilities for a portion of a program, such as each individual minute of a television program. Viewing within particular demographic groups may also be projected for households where individual member information is not known based on the observed and projected person-level data, providing more accurate and useful viewership information to broadcasters, advertisers, and others.

Figure 1:
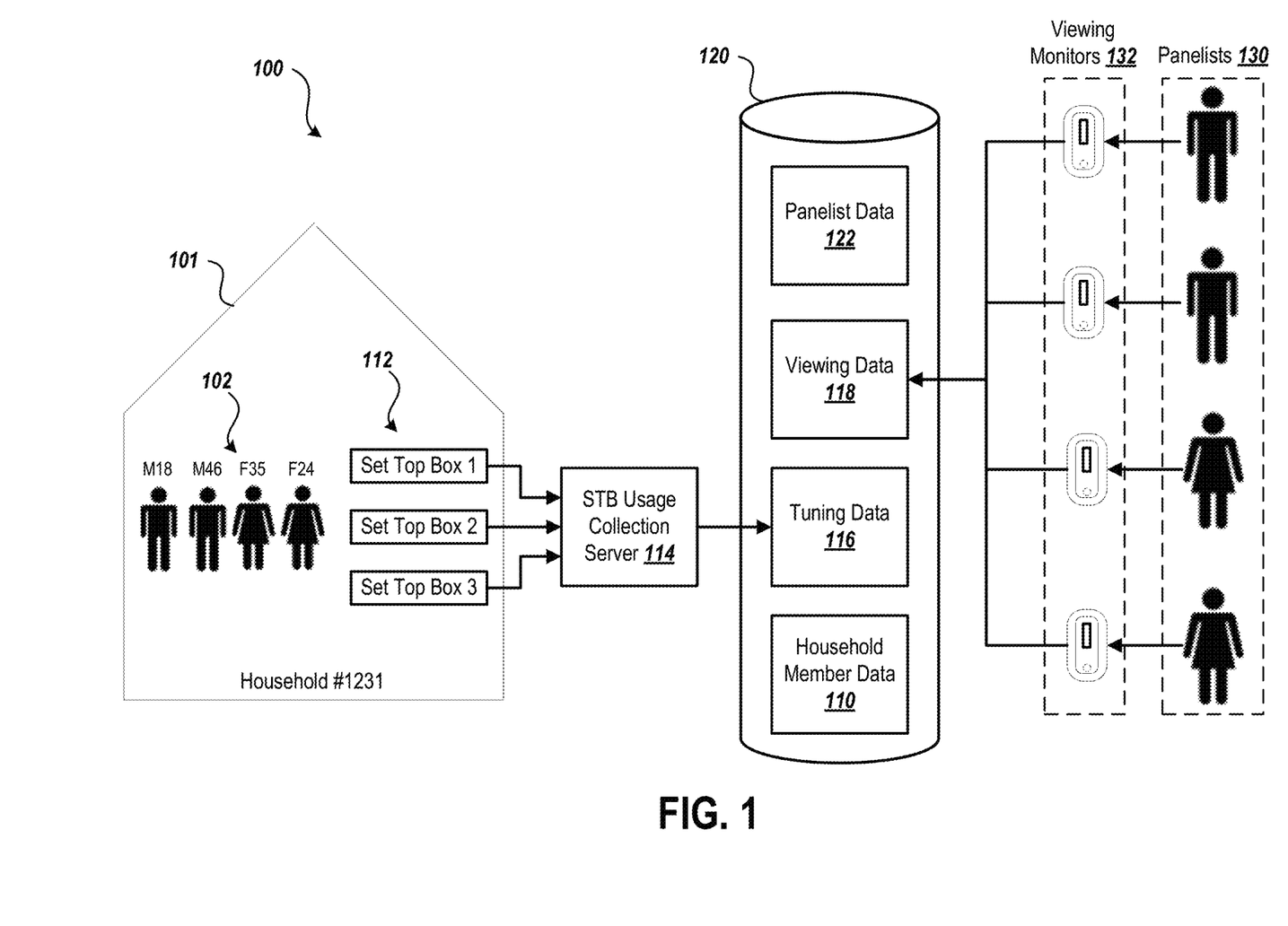
FIG. 1 illustrates an example system in which television viewership information may be collected and processed to determine audience measurement data.

FIG. 1 illustrates an example of a system 100 in which television viewership information may be collected and processed to determine audience measurement data. The system 100 includes a number of households, such as household 101, that includes one or more set top boxes 112 for viewing television programs. The set top boxes 112 record data for tuning events (e.g., viewing events), which may represent a particular television network or program being watched at a particular time. The set top boxes 112 may report these tuning events to a set top box usage collection server 114, which may store tuning data 116 representing these tuning events in a database or other storage 120. In addition to tuning events, the tuning data 116 may include data to identify the household 101 and set top box 112, stream control data, data representing content recorded by the set top box 112, programs ordered on the set top box 112, and data about when the set top box 112 was on or off. Other data about the status of the set top box 112 and user interaction with the set top box 112 may also be recorded and included in tuning data 116.

The household 101 includes one or more members 102 that use the set-top boxes to watch television. These members 102 may be associated with demographics, such as age and gender, and these demographics may be collected and stored in storage 120 or another storage as household member data 110. In the example shown, the household 101 includes four members 102: an 18-year-old male, a 24-year-old female, a 35-year-old female, and a 46-year-old male. Their specific age and gender may be stored in household member data 110, or the members may instead be associated with demographic groups. For example, each member 102 may be associated with an age group (for example: 18-24, 25-34, 35-44, 45-54, 55-64, or 65+), rather than specific age. This information may also be stored in the household member data 110. Other demographics may be collected, such as occupation, income, or ethnicity. In addition, a geographic area or location for the household 101 may be stored in the household member data 110. In some cases, the geographic area or location for the household 101 may be stored as a demographic attribute of the individual members of the household.

The demographic information for the household members 102 may be collected in a number of ways. For example, the household 101 may be recruited to be part of a television viewing panel that is used to determine television viewership data. Once the household 101 is recruited, the demographic information may be collected as part of a registration process.

In another example, the household 101 may be a part of, or recruited into, an Internet usage panel that is used to determine Internet usage. Demographic information of the household members 102 may be collected when the household 101 is registered to be part of the Internet usage panel. As part of the Internet usage panel, the household 101 may have a panel application installed on one or more client systems in the household. The panel application may collect internet usage data to send to an internet usage collection server. In some implementations, the internet usage data could be used to infer information about household member 102, such as by comparing internet content accessed by each member 102 with demographic or other information about users accessing the same content. Other methods may be used to capture or confirm information about members 102 of the household 101, such as survey data or data captured from other household behaviors, or data provided by third party services that attempt to determine demographic data of household members 102.

The system 100 includes a plurality of panelists 130. The panelists 130 may be persons who have provided demographic and other information about themselves, and who opted to have their television viewing behavior monitored. The panelist data 122 stored in the data store 120 includes the demographic and other information provided by or otherwise obtained from the panelists 130. In some cases, the panelists 130 may be associated with households having associated information, such as household size, household roster, and other information, which may be included in panelist data 122. In some implementations, the viewing data 118 may represent viewing data from panelists 130 associated with households including only other panelists, such that a complete representation of all television viewing within the household is included in the viewing data 118.

In some implementations, the viewing data 118, unlike the tuning data 116, may represent person-level viewing activity for the individual panelists 130. For example, a television viewing event in the viewing data 118 may represent a particular panelist 130 watching a television program for a period of time, as opposed to the tuning data 116, which may represent the television program being watched in the household for a period of time, but may not represent which of the individual members of the household watched the program.

Each of the panelists 130 is associated with a viewing monitor 132. In some cases, the viewing monitors 132 may be portable computing devices carried by each of the panelists 130 that monitor television viewing by the panelist carrying the device. For example, the viewing monitors 132 may be devices operable to capture and analyze sound information to determine if the panelist 130 is watching a particular television program. In some cases, the viewing monitors 132 may extract encoded signals from the sound information identifying the particular television program being watched by the panelist 130. The viewing monitors 132 may also identify the particular television program from the sound information using other mechanisms, such as, for example, by generating acoustic fingerprint from the sound information in querying a database mapping known acoustic fingerprints to television programs. In some implementations, the viewing monitors 132 may monitor other types of information to determine a television program being watched by the panelist 130, such as, for example, video information, radio frequency (RF) signals, infrared (IR) signals, or other information.

The viewing monitors 132 produce viewing data 118 representing viewing activity by the panelists 130. In some implementations, the viewing monitors 132 may provide viewing data 118 directly to the data store 120. The viewing monitors 132 may also provide the viewing data 118 to a separate collection server or set of servers, and the viewing data 118 may be acquired by or otherwise stored in the data store 120. In some implementations, the viewing data 118 includes information regarding television viewing events, such as, for example, a television program being watched, a television network, an entity operating the television network, a start time and stop time for the television viewing event, an identifier of the panelist 130 associated with the television viewing event, or other information.

When reporting tuning events, the set top boxes 112 may not be able to directly report the particular household member or members 102 associated with each tuning event. For example, in some implementations, the tuning data 116 may include episode viewership for the household 101, but may not include a breakdown of the viewership of individual members 102 of the household 101. As described further below, the household member data 110, tuning data 116, viewing data 118, and panelist data 122 may be used to determine, for a given program, values for members 102 of the household 101 that represent the probability that the corresponding member 102 watched the program, as well as to project a number of watched minutes for the viewing event for each individual member 102 of the household 101. These values can be aggregated for various demographic groups in order to generate demographic viewership data for the episode, program, or network.

Figure 2:
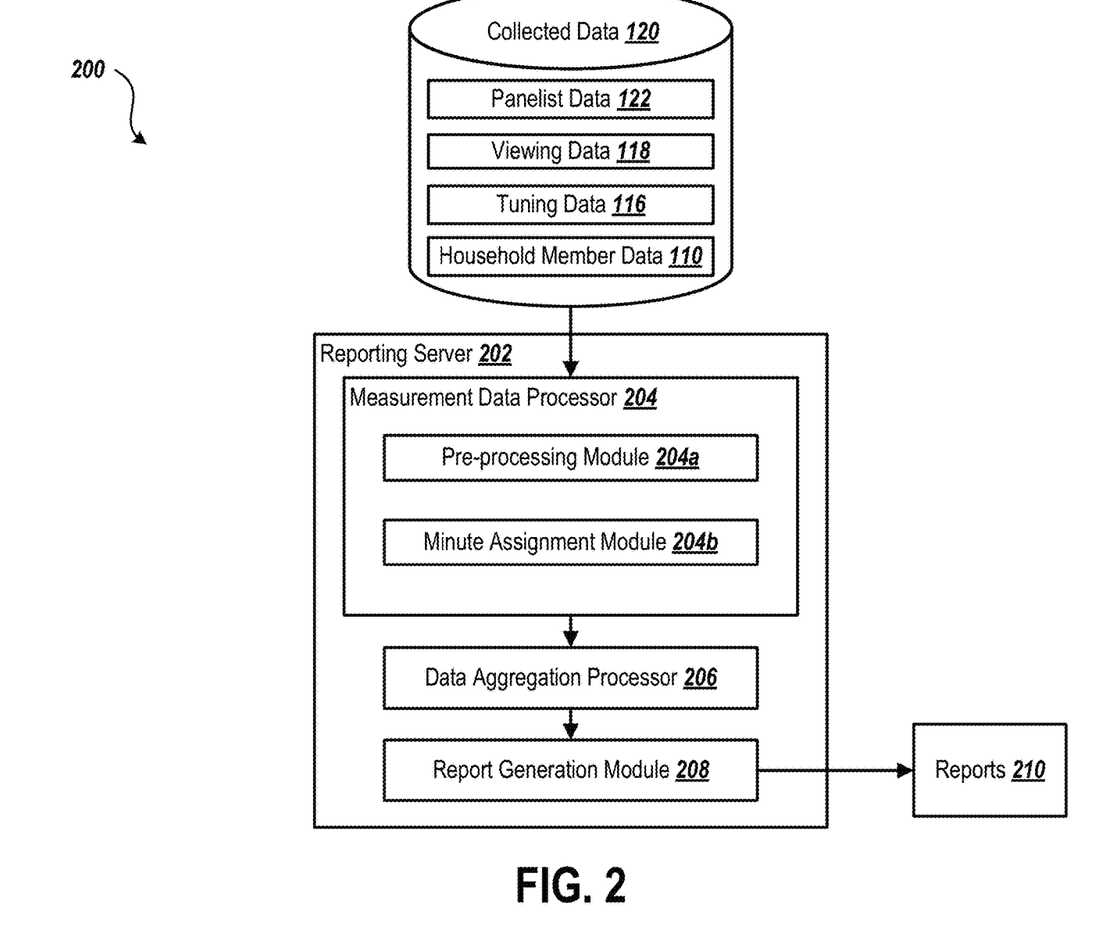
FIG. 2 illustrates an example system in which person-level viewing data can be used to project person-level viewership data for a household from household-level tuning data through demographic attribution.

FIG. 2 illustrates an example of a system in which person-level viewing data can be used to generate projected person-level viewing data from household-level tuning data through demographic attribution. The system 200 includes a reporting server 202. The reporting server 202 may be implemented using, for example, a general-purpose computer capable of responding to and executing instructions in a defined manner, a personal computer, a special-purpose computer, a workstation, a server, or a mobile device. The reporting server 202 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 202.

The reporting server 202 executes instructions that implement a measurement data processor 204, a data aggregation processor 206, and a report generation module 208. The measurement data processor 204 includes a pre-processing module 204a and a minute assignment module 204b. The measurement data processor 204 and report generation module 208 may be operable to generate viewership data based on the household member data 110, tuning data, 116, viewing data 118, and panelist data 122 and use that data to generate one or more reports 210 that include information regarding episode-level, program-level, network-level, or entity-level viewership.

Figure 3:
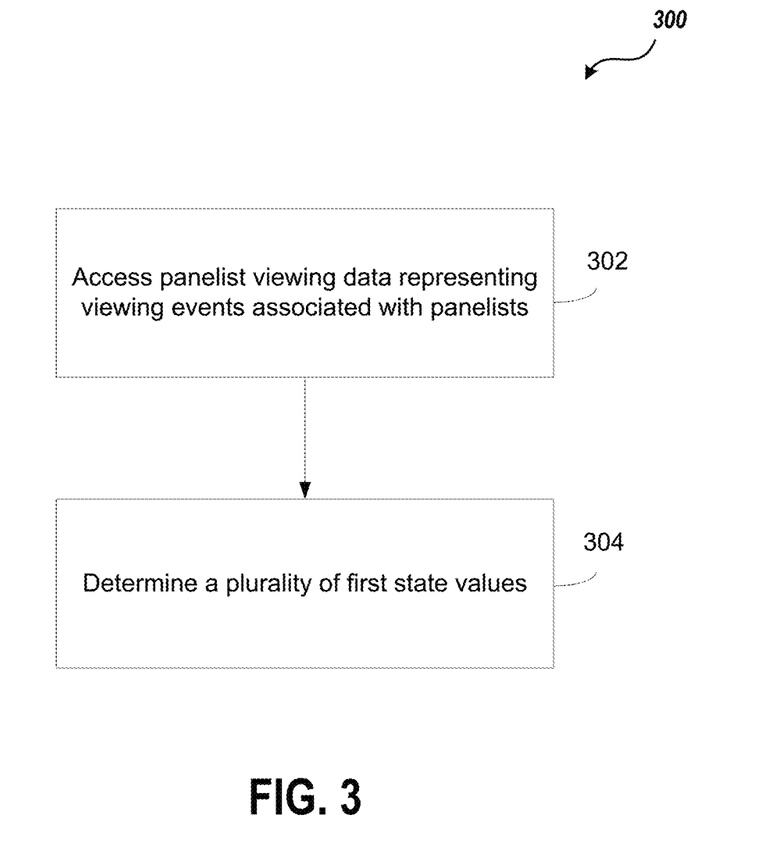
FIG. 3 is a flow diagram illustrating an example process for determining a plurality of state values associated with panelist viewing data.

FIG. 3 is a flow diagram illustrating an example process 300 for determining whether a particular portion (e.g., one minute) of a program was watched or not watched by one or more panelists 130. The following describes the process 300 as being performed by components of the reporting server 202 with respect to data associated with the panelists 130. However, the process 300 may be performed by other systems or system configurations and implemented with respect to other members of the viewing audience.

At step 302, the pre-processing module 204a accesses a portion of the collected data 201, including the viewing data 118 and the panelist data 122. The pre-processing module 204a may perform one or more pre-processing functions on the viewing data 118 and the panelist data 122 as appropriate. In some cases, the pre-processing module 204a may identify particular elements of the viewing data 118, such as age category, gender, race, occupation, geographic area, or other elements associated with the panelists.

In some cases, the pre-processing module 204a may sort the viewing data 118 into particular demographic categories based on the particular panelist 130 associated with each viewing event in the viewing data 118. In some cases, the pre-processing module 204a may examine the demographic distribution of the panelists 130 associated with the viewing data 118, and may apply weighting factors to the viewing data 118 to correct any bias in the demographics of the panelists. For example, if the panelists 130 include 80% females and 20% males, the pre-processing module 204a may down-weight the data associated with the female panelists and up-weight the data associated with the male panelists to correct for the gender bias in the sample. This gender bias is indicated by the demographics of the sample being dissimilar to the demographics of the population as a whole (i.e., an 80% female sample may not be representative of the overall population, which is roughly 50% female).

In some implementations, the viewing event may be associated with a program, such as a particular episode of a television program. In some implementations, the television viewing event may not be associated with a particular program but may be associated with tuning data 116 such as a date, time, and television network.

At step 304, the minute assignment module 204b may determine a plurality of state values corresponding to a particular portion of the program and representing whether the program was watched or not watched for the particular portion of the program by a given one of the panelist members. The particular portion of the program may correspond to a one minute duration of the program. The plurality of state values may comprise a first value associated with the program being watched for the particular minute of the program and a second value associated with the program not being watched for the particular minute of the program.

In order to determine the plurality of state values, a model may be constructed by considering each minute as a state. A person at minute t must be in one of the states, either "watch" (W) or "not watch" (NW) for each of a plurality of states $S=s_1, s_2, \ldots, s_L$. The process may begin in one of these states and may change from one minute to another. If the viewer is currently in state $s_i$, then it may move to state $s_j$ with a probability denoted by $p_{i,j}$. This is also known as the "transition probability." The transition probability from one state to another is not dependent on which state the chain was in before the current state. Each viewer has his/her own transition probability $p_{t,t+1}$ to jump from minute $s_t$ to minute $s_{t+1}$. By estimating the transition probabilities, the probability of the program being watched (W) or not watched (NW) for each particular minute of the program can be calculated.

The plurality of state values may be used to determine a total number of watched states (L) and a number of consecutive watched states (N) by a household member. The total number of minutes of a program watched by a given household member may be represented by the variable L. The variable L may also be represented as the number of transitions from a watched state (W) to a watched state (W) or from a watched state (W) to a not watched state (NW). The number of continuous watched states by a household member may be represented by the variable N. In other words, the variable N may represent the number of times where $s_t < s_{t+1}$.

An example nine minute television program may be represented as follows:
(W) (W) (W) (NW) (W) (NW) (NW) (W) (W).

Each of the state values of the program may correspond to a particular minute of the program. Thus, the program may have been watched by a given member of the household for the first three minutes of the program, not watched for the fourth minute of the program, watched for the fifth minute of the program, not watched for the sixth and seventh minutes of the program, and watched for the eighth and ninth minutes of the program. Thus, it can be determined that L=6 since there are a total of six watched states out of the nine total states. In addition, we can determine that N=3 since there are three consecutive series of watched states (e.g., a first series of three watched states, a second series of one watched state, and a third series of two watched states).

TABLE 1

Example Transition Matrix

| #transitions | watch | not watch | row_sum |
|---|---|---|---|
| watch | L − N | N | L |
| not watch | N | hh_minutes + hh_session − N − L | hh_minutes + hh_session − L |

The values of L and N may be used to further predict the transition probability (p) that the show was watched at minute $s_t$ and was watched again at next minute $s_{t+1}$ and also to predict the transition probability (q) that the show was not watched at minute $s_t$ and was not watched again at next minute $s_{t+1}$. A probability matrix may be generated as follows using the values of p and q:

TABLE 2

Example Probability Matrix

| prob( ) | watch | not watch |
|---|---|---|
| watch | p | 1 − p |
| not watch | 1 − q | q |

If minute $s_t$=watch and minute $s_t$+1=watch, then we may denote the transition probability $p_{t,t+1}$=p. If minute $s_t$=not watch and minute $s_t$+1=not watch, then we may denote the transition probability $p_{t,t+1}$=q. The values of p and q may also be defined as follows:

p=1−N/L, and
q=1−N/(hhMinutes+hhSession−L).

There may be a number of boundary conditions associated with the model. Example boundary conditions include but are not limited to the following:

Any minute watched by a member of the household is a minute watched by that household. Therefore, person level viewing minutes should always be less than or equal to the household viewing minutes (Li<=household minutes);

In the application, live viewing and playback viewing may be modeled separately. The model assumes that even with playback, the household minutes value may be less than or equal to the entire runtime of the program (household minutes<=R);

With the possibility of multiple members of the family viewing together (co-viewing behavior), each minute may be counted multiple times on the person level and counted only once on the household level. This means that the household minutes value is always less than or equal to the sum of person minutes (household minutes<=sum($L_i$));

Any transition from watching to not watching may be counted as starting a new session (count towards N) and any transition from watching to watching or watching to not watching is counted as already viewing the previous minute (count towards L). Therefore, we have 0<=Ni<=Li;

Consecutive sessions may be combined (Ni+Li<=R+1);

The household session may be less than or equal to the total number of overlapping sessions for each person in the household (householdSession<=sum(Ni));

If the show is viewed in full duration, then p=1 and q=0. Conversely, if the shows is not viewed at all, then p=0 and q=1.

Figure 4:
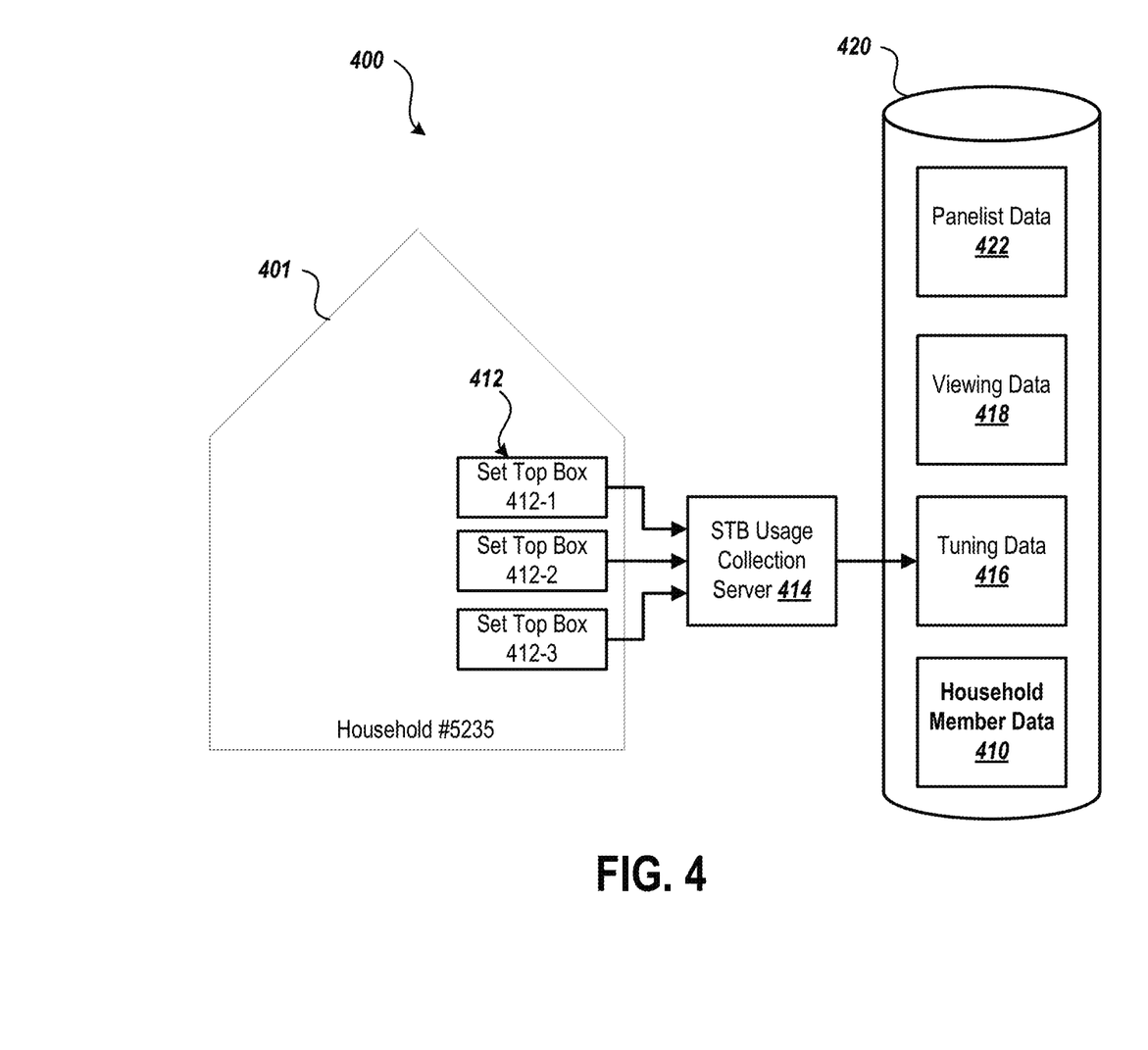
FIG. 4 illustrates an example system in which television viewership information may be collected and processed to determine audience measurement data for non-rostered households.

FIG. 4 illustrates an example of a system 400 in which television viewership information may be collected and processed to determine audience measurement data for non-rostered households. Similarly to the system 100 of FIG. 1, system 400 includes a household 401 including set top-boxes 412 for viewing television content. The set top boxes 412 report tuning events to the STB collection server 414, which stores the tuning events as tuning data 416 in data store 420. The data store 420 also includes household member data 410 having information for individual members of households. In some cases, the household 401 may not be associated with information regarding individual members of the household, making household 401 a "non-rostered" household.

The data store 420 may include viewing data 418. In some cases, the viewing data 418 may include observed person-level viewing data from one or more panelists associated with panelist data 422, such as described relative to FIG. 1. The viewing data 418 may also include projected person-level viewing data calculated for tuning data 416 for rostered households associated with individual member information in the household member data 410 (e.g., household 101 from FIG. 1).

Figure 5:
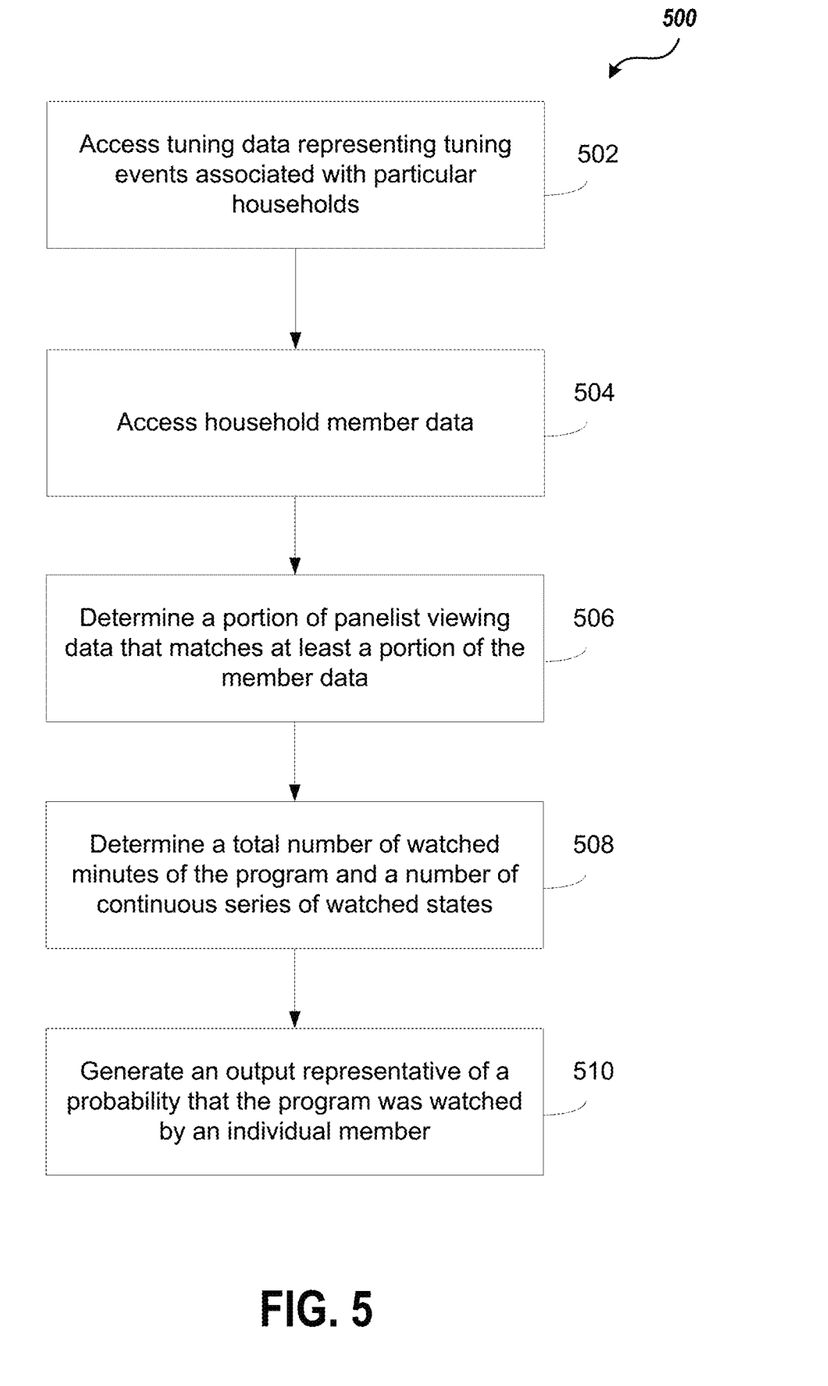
FIG. 5 is a flow diagram illustrating an example process for generating a report indicative of a probability that an individual household member will watch a portion of a program.

FIG. 5 is a flow diagram illustrating an example process 500 for determining a probability that an individual household member will watch a particular portion of a program. The following describes the process 500 as being performed by components of the reporting server 202 with respect to data associated with the household 101. However, the process 500 may be performed by other systems or system configurations and implemented with respect to other members of the viewing audience.

At step 502, the pre-processing module 204a accesses the collected data 201, including household member data 410, tuning data 416, viewing data 418, and panelist data 422. The pre-processing module 204a may perform one or more pre-processing functions on the household member data 410, tuning data 416, viewing data 418, and panelist data 422 as appropriate.

At step 504, the pre-processing module 204a may identify particular elements of the household member data 410 for use in comparison with the panelist data 422 associated with the viewing data 418, such as age category, gender, race, occupation, geographic area, or other elements. Information about the household as a whole, such as household size or income, may also be identified for use. Each household member may be identified by one or more demographic dimensions relevant to the particular application of the demographic attribution model.

In some cases, the pre-processing module 204a may sort the household member data 410 into particular demographic categories for demographic attribution. The pre-processing module 204a may also sort the viewing data 418 into particular demographic categories based on the particular panelist 130 associated with each viewing event in the viewing data 418. The pre-processing module 204a may identify the particular program associated with a household event within the tuning data 416. In some cases, the pre-processing module 204a may examine the demographic distribution of the panelists 130 associated with the viewing data 418 and may apply weighting factors to the viewing data 418 to correct any bias in the demographics of the panelists, as discussed above in connection with FIG. 3.

In some implementations, the pre-processing module may extract the tuning event data for the television viewing event from a larger collection of tuning data 416 involving multiple tuning events. In some implementations, other relevant tuning events may also be extracted (such as simultaneous events as further described below).

In some implementations, the television viewing event may be associated with a particular episode of a television program. In some implementations, the television viewing event may not be associated with a particular program but may be associated with tuning data 416 such as a date, time, and television network.

The pre-processing module 204a may extract the viewing data 418 for demographic groups matching the individual members of the household 101 and demographic groups from households that match the household 101 as a whole. For the example of the household 101 as shown in FIG. 1, the pre-processing module 204a may extract the viewing data for 18-year-old males in households with four people, 24-year-old females in households with four people, 35-year-old females in households with four people, and 46-year-old males in households with four people.

The viewing data 418 may be for the viewership of television viewing events sharing one or more characteristics with the television viewing event represented by the tuning data 416. For example, where the tuning data 416 represents a television viewing event represented by a particular episode of a television program, the viewing data 418 may be for the viewership of the television program by the panelists 130. If the television viewing event is represented by a date, time, and network, the viewing data 418 may be for the viewership of the network at the date and time by the panelists 130.

At step 506, a portion of the panelist viewing data whose panelist information matches at least a portion of the member data of the one or more individual members of the household may be determined.

In one example, the measurement data processor 204 accesses the tuning data 416 and the person-level viewing data 418. The tuning data 416 may include tuning data for rostered households and non-rostered households. In some cases, the tuning data 416 includes a particular television program watched during each viewing event and a household minutes value representing a number of minutes the particular household watched the particular television program during each viewing event. The person-level viewing data 418 may represent television viewing events associated with panelist members of other households different than the particular household, and may include a particular television program watched during the viewing event and a panelist minutes value representing a number of minutes the particular panelist member watched the particular television program.

The measurement data processor 204 identifies group subsets including tuning data 416 having matching values for a grouping criteria including attributes included in the tuning data and the person-level viewing data. For example, the measurement data processor 204 may identify group subsets of tuning data 416 for particular geographic areas, such that each group subset includes tuning data for households in that region (e.g., a group subset for Texas, another group subset for New York, etc.). The grouping criteria for the group subsets may also include other criteria or combinations of criteria, including number of set-top-boxes, household size, and other criteria.

For each particular group subset identified at 604, the measurement data processor 204 identifies matching person-level viewing data including person-level viewing data that matches values for group criteria associated with the particular group subset. For example, for a group subset for the geographic area "Texas," the measurement data processor 204 may identify matching person-level viewing from the viewing data 418 also associated with "Texas."

The measurement data processor 204 calculates a unique viewers value for the group subset based on the matching person-level viewing data. In some cases, the unique viewers value represents an estimated number of individual members of households associated with the tuning data included in the group subset that watched the particular television program. In some implementations, calculating the unique viewers value includes determining a members per household number for the matching person-level viewing data, wherein the unique viewers value for the particular group subset is based at least in part on the members per household number.

Calculating the unique viewers value may include calculating a set of demographic unique viewers values, wherein each demographic unique viewers values is associated with a particular one of a plurality of demographic groups and represents an estimated number of individual members in the particular demographic group from households associated with the tuning data included in the group subset that watched the particular television program.

For example, to calculate a unique viewers value for a show called "SNL," the measurement data processor 204 may determine a members per household number of 2.5 for Texas by determining the average number of persons in households represented by the viewing data 418 (e.g., by dividing the total number of persons in all households by the number of households). The measurement data processor 204 may also determine that 80% of viewers represented by the viewing data 418 watched SNL. If the non-rostered tuning data represents 10 households, the measurement data processor 204 may estimate that these households include 25 individual members (e.g., 10 households×2.5 members per household), and that 20 of them watched SNL based on 80% viewership. If the viewing data shows that viewers for SNL were 60% male and 40% female, the measurement data processor 204 may estimate that 12 males (60% of the 20 estimated viewers) and 8 females (40% of the 20 estimated viewers) watched SNL in the 10 households.

The measurement data processor 204 calculates a person-level minutes value for the group subset based on the matching person-level viewing data 610A. A person-level minutes value for an advertisement shown during the television program may also be determined, as shown in 610B. In some implementations, the person-level minutes value represents an estimated number of minutes individual members of households associated with the tuning data included in the group subset watched the particular television program. In some cases, calculating the person-level minutes value for the group subset includes determining a co-viewing factor for the matching person-level viewing data representing a ratio of household-level viewing minutes to person-level viewing minutes for the group subset, wherein the person-level minutes value for the group subset is based at least in part on the co-viewing factor.

At step 508, for each of the individual members of the household, a total number of watched minutes of the program by the individual member of the household and a number of continuous series of watched states of the program by the individual member of the household may be determined.

This process may begin by estimating the value of L for the tuning data 416 associated with the household member data 410. The viewing minutes L in the tuning data 416 may be determined based on the mixture of two distributions: a quasi Poisson (m1) distribution and a LogNormal distribution (m2). The two distributions may be separated using the parameter $\pi$, defined as the probability of picking the LogNormal (m2) distribution. Using the model described herein, a number can be randomized between [0,1]. If the result is greater than $\pi$, the Poisson distribution may be used. Otherwise, the LogNormal distribution may be used.

The value of L may be determined using the following formula:

$$L=(1-\pi)*m1+(\pi)*m2,$$

where
m1=Poisson($\lambda$), and
m2=hhMinutes*LogNormal($\mu$,$\sigma$2).

The parameter $\pi$ may be modeled through the following weighted generalized linear model. Since mixture weight parameter $\pi$ is an indicator that L falls into the lognormal portion of the mixture distribution, and this event is discrete and binary, the event follows a binomial distribution.

$$glm(hhSize+hhMinutes+GenderAge+DayBin+\\HourBin+Genre+ContentRuntime+Network-\\Type,family=binomial(link="logit"),weights=ceil\\(TrainingSetPersonWeights)).$$

To model the mixture distribution parameter $\pi$ and the Poisson distribution parameter $\lambda$, a generalized linear model may be used with weights to correct for sample bias in the training set. Demographic information may be used to correct the sample bias towards the population target, including gender, age, presence of children, household size, race, ethnicity, income, etc. The generalized linear model may also include certain pieces of demographic information, as well as the household tuning behavior (such as household minutes), together with the program information (such as genre, content runtime, broadcast or cable, etc.).

Assuming that L falls into the m1 part of the distribution with probability (1−$\pi$), then the Poisson distribution can be estimated using the following formula:

$$glm(hhSize+hhMinutes+GenderAge+Genre+Con-\\tentRuntime+NetworkType,family=quasipoisson\\(link="log"),weights=cell(TrainingSetPerson-\\Weights)).$$

As for the lognormal distribution, we can fit for the shape and scale parameters ($\sigma$ and $\mu$) using a generalized additive model weighted by the aforementioned panelists' weights. Assuming that L falls into the m2 part of the distribution with probability $\pi$, then the LogNormal distribution can be estimated using the following formula:

$$gamlss(hhSize+hhMinutes+GenderAge+Genre+Con-\\tentRuntime+NetworkType,family=LOGNO2,\\weights=cell(TrainingSetPersonWeights)).$$

Unlike the L model, the empirical distribution of N shows a single peak distribution instead of a bi-modal distribution. Therefore, it's sufficient to model N using a Poisson distribution with a weighted generalized linear model using the following formula:

$$glm(hhSession+log(hhMinutes/ContentRuntime)+\\GenderAge+Genre\ family=quasipoisson\\(link="log"),weights=cell(TrainingSetPerson-\\Weights)).$$

After the values of L and N have been determined, the values of p and q may be calculated as follows:

$$p=1-N/L, \text{ and}$$

$$q=1-N/(hh\text{Minutes}+hh\text{Session}-L).$$

Once the values of p and q have been determined, we can estimate the probability that a given person in the household watched the television show. This may be determined using the following formula:

$$UV_i=1-Pr(X_0=NW)\cdot Pr(NW\rightarrow NW)^{hhminutes}=1-q_i^{hh\text{-}minutes},$$

and $$\text{ViewingMinute}_i=Li$$

In other words, the probability of a family member watching at least one minute of the program in a household where a tuning event of this program is observed is equal to one minus the probability that this member doesn't watch any minute of show at all. which can be formally written as this member start from not watching at state zero and continue to go from not watching to not watching for the entire time when there are other member in this household watching the show.

Further, the probability that a particular household watched the program may be calculated using the following formula:

$$CVF_{HH}=(\Sigma_{i\in HH}L_i)/HH_{minutes}.$$

For each minute t that is marked as "watching," it can be determined that the probability of watching minute t where m is the $m^{th}$ minute in the session $s_j$ is:

$$\begin{aligned}
\text{ViewingMinute}_t &:= \rho t \\
&= Pr(X_t = W) \\
&= 0 \text{ (if } HH_t = NW\text{), otherwise:} \\
&= ((1+q)\cdot(1-(p+q-1)^m)/(2-p-q)) + \\
&\quad (l_i\cdot(p+q-1)^m)/(HH_{minutes}+HH_{session})),
\end{aligned}$$

and $$\begin{aligned}
UV_t = E(X_t = W) &= 1\cdot Pr(X_t = W) + 0\cdot Pr(X_T = NW) \\
&= \text{viewingMinute}_t \\
&= \rho_t
\end{aligned}$$

At step 510, the report generation module 208 may generate viewership reports 210 based on the above-determined viewership data. These reports may include data at any level of aggregation, and may be specified by a user. Reports may include the viewership data of various demographic groups as estimated through the use of demographic attribution. Entities may request particular demographic data and data at a particular level of aggregation.

For example, a program-level report may show that a particular portion of a program has been watched by 12% of males ages 18-24. A network-level report may show that 45% of viewers of a particular network are females above age 40. An entity-level report may show that 57% of males and 25% of females watched at least a portion of the entity's sports networks during the time period representing this year's regular baseball season.

Because a household may have more than one set top box and more than one display device, at times there may be more than one program episode being viewed at a time by members of a household. In some implementations, the existence of more than one program episode being viewed at the same time in a household may affect the fractional values determined for members of that household for one or both of the viewing events.

In some implementations, the pre-processing module 204a identifies simultaneous events associated with the same household generated by set top boxes. Simultaneous events are those that include at least some overlap in the times in which the events are shown. In some cases, simultaneous events may have to have at least a threshold amount of overlap to be considered simultaneous; that is, nominal overlap between the first and last minutes of events that are primarily at different times may not be identified as simultaneous.

Figure 6:
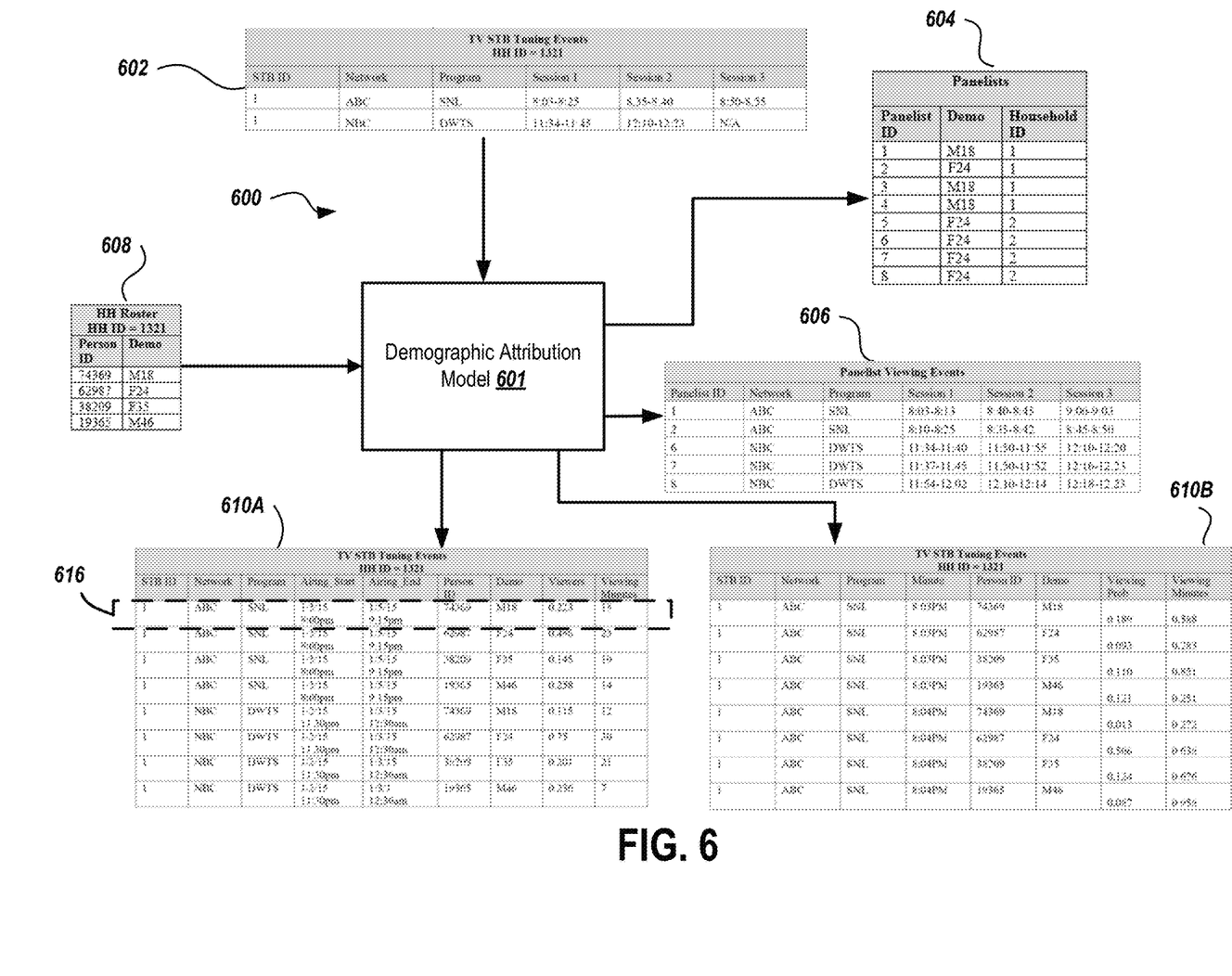
FIG. 6 is a block diagram applying a demographic attribution model to person-level viewing data and household-level tuning data to project person-level viewership for the household.

FIG. 6 is a block diagram applying a demographic attribution model to person-level viewing data and household-level tuning data to project person-level viewership for the household. As shown in a tuning events table 602, a television viewing event occurred on January 2 associated with the show "DWTS" on the network "ABC." Another tuning event occurred on January 5 associated with the show "SNL" on the network NBC. The table 604 shows a roster of panelists having their television viewing activity monitored (as previously described relative to FIG. 1), their associated demographic groups, and their associated households. Table 606 includes television viewing events representing the panelists watching the shows "DWTS" and "SNL."

Table 608 includes a household roster for the household associated with the tuning events in table 602. As shown, that also includes an 18-year-old male, 24-year-old female, a 35-year-old female, and a 46-year-old male.

Demographic attribution model 601 is used to project person-level viewing events in the table 610A from the tuning events in table 602, the household roster in table 608, the panelist roster in table 604, and the panelist viewing events in table 606. For explanatory purposes, the following discussion will focus on example viewing event 616 in the person level viewing events in table 610A.

As shown, viewing event 616 associates a demographic of "18-year-old male" to the viewing event for "SNL" for set top box 412-1. The viewing event 616 represents the projected person level viewing event for the 18-year-old male in the household (person ID 74369). The viewing event 616 includes a views value of 0.223. This value is a fractional viewership value indicating that the 18-year-old male has a 22.3% probability of watching this viewing event. In some cases, this probability may be calculated based on panelist viewing events for panelists in the same demographic group (i.e., panelist IDs 1-4). The table 606 shows panelist viewing events for panelist IDs 1 and 2 only. Accordingly, two of the possible four panelists from this demographic watched "SNL," yielding a probability of 22.3% that the 18-year-old male in the household roster in that demographic watched "SNL."

The viewing event 616 also includes a minutes value of 18 representing the projected number of minutes the 18-year-old male watched "SNL." In some cases, this minutes value may, again, be calculated based on panelist viewing events for panelists in the same demographic group (i.e., panelist IDs 1-4). As shown in Table 606, Panelist ID 1 watched "SNL" from 8:03-8:13, from 8:40-8:45 and from 9:00-9:03 (18 minutes), while Panelist ID 2 watched "SNL" from 8:10-8:25, from 8:35-8:42 and from 8:45-8:50 (27 minutes). Accordingly, panelists matching the demographics of the 18-year-old male member of the household watched "SNL" for an average of 22.5 minutes (i.e., 18 minutes+27 minutes/2 panelists).

In some implementations, panelists in the demographic that did not watch the show may be included with a zero minute value in an average minutes per audience member calculation. For example, if the table 606 included two other 18-year old males who did not watch "SNL," the average minutes per audience member calculation for the program would represent that each 18-year-old male audience member watched the program for 11.75 minutes (i.e., 18 minutes+27 minutes+0 minutes+0 minutes/4 panelists).

Although specific examples using various equations of probability are described herein, the methods described herein can be used with a variety of probability and statistical techniques and are not limited to only the equations and examples shown.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

What is claimed is:

1. A computer-implemented method, comprising:
   accessing panelist viewing data representing viewing events associated with panelists, each viewing event in the panelist viewing data including an identification of a program associated with the viewing event and a panelist minutes value representing a number of minutes a panelist was exposed to the program during the viewing event;
   determining, based on the panelist viewing data, a plurality of state values, each of the state values corresponding to a different portion of the program and representing whether the corresponding portion was watched by a given one of the panelists, wherein the plurality of state values comprise a state value indicating that a particular portion of the program was watched and another state value indicating that another particular portion of the program was not watched;
   accessing tuning data representing tuning events associated with particular households, each tuning event in the tuning data including an identification of a particular program associated with the tuning event and a household minutes value representing a number of minutes the particular program was played at a particular household in association with the tuning event; and
   for at least one tuning event represented by the tuning data:
      accessing household member data descriptive of one or more individual members of a household associated with the tuning event;
      determining that at least a portion of the panelist viewing data, which includes information descriptive of the panelists, matches at least a portion of the household member data;
      determining, for each of the one or more individual members of the household, a total number of watched portions and a total number of series of continuous portion-watching of the particular program identified by the at least one tuning event; and
      generating, based on the total numbers, an output representative of a probability that at least a portion of the particular program identified by the at least one tuning event was watched by at least one of the one or more individual members.

2. The method of claim 1, further comprising determining, based on the plurality of state values, a number of transitions by the given one of the panelists between the watched state and the not watched state.

3. The method of claim 2, further comprising determining, for each of the individual members of the household and based on the portion of the panelist viewing data, a probability that the individual member of the household will transition from the watched state to the not watched state.

4. The method of claim 1, wherein each portion of the programs has a one minute duration.

5. The method of claim 4, wherein one or more portions interpose the series, the one or more portions corresponding to the other state value, an
   wherein each of the series comprises one or more consecutively watched portions.

6. The method of claim 1, wherein each of the programs is at least one of a television program and a movie program.

7. The method of claim 1, wherein the panelist viewing data is generated based on a panel application monitoring viewing behavior of the panelists.

8. The method of claim 1, wherein:
the household member data includes one or more demographic groups to which the at least one individual member belongs; and
the panelist viewing data includes one or more demographic groups to which at least one of the matched panelists belongs.

9. The method of claim 1, wherein:
the household member data includes a geographic area for the at least one individual member; and
the panelist viewing data includes a geographic area for at least one of the matched panelists.

10. The method of claim 1, wherein the determination of the total numbers comprises, for at least one of the individual members:
determining that a particular episode of a program is associated with the at least one tuning event; and
determining a fraction of members of panelist households that watched the particular episode that have panelist information matching the member data for the at least one individual member.

11. The method of claim 1, wherein the determination of the total numbers comprises, for at least one of the individual members:
determining that a particular network is associated with the at least one tuning event; and
determining a fraction of members of panelist households that watched the particular network that have panelist information matching the household member data for the at least one individual member.

12. The method of claim 1, wherein:
the tuning data includes a time, date, and network for each tuning event; and
the determination of the total numbers comprises, for at least one of the individual members:
determining a fraction of panelist members of other households with panelist information matching the household member data for the at least one individual member that watch the network at the time and date associated with the at least one tuning event.

13. A device comprising a processor and a memory, the memory storing computer executable instructions which, when executed by the processor, cause the device to perform operations comprising:
accessing tuning data representing tuning events associated with particular households, each tuning event in the tuning data including an identification of a particular program associated with the tuning event and a household minutes value representing a number of minutes the particular program was played at a particular household in association with the tuning event;
accessing panelist viewing data representing viewing events associated with panelists, each viewing event in the panelist viewing data including an identification of a program associated with the viewing event and a panelist minutes value representing a number of minutes a panelist was exposed to the program during the viewing event;
determining, based on the panelist viewing data, a plurality of state values, each of the state values corresponding to a different portion of the program and representing whether the corresponding portion was watched by a given one of the panelists, wherein the plurality of state values comprise a state value indicating that a particular portion of the program was watched and another state value indicating that another particular portion of the program was not watched;
for at least one tuning event represented by the tuning data:
accessing household member data descriptive of one or more individual members of a household associated with the tuning event;
determining that at least a portion of the panelist viewing data, which includes information descriptive of the panelists, matches at least a portion of the household member data;
determining, for each of the one or more individual members of the household, a total number of watched portions and a total number of series of continuous portion-watching of the particular program identified by the at least one tuning event; and
generating, based on the total numbers, an output representative of a probability that at least a portion of the particular program identified by the at least one tuning event was watched by at least one of the one or more individual members.

14. The device of claim 13, wherein the instructions when executed further cause the device to perform operations comprising determining, based on the plurality of state values, a number of transitions by the given one of the panelists between the watched state and the not watched state.

15. The device of claim 14, wherein the instructions when executed further cause the device to perform operations comprising determining, for each of the individual members of the household and based on the portion of the panelist viewing data, a probability that the individual member of the household will transition from the watched state to the not watched state.

16. A non-transitory, computer-readable storage medium comprising computer-executable instructions which, when executed by a device, cause the device to perform operations comprising:
accessing tuning data representing tuning events associated with particular households, each tuning event in the tuning data including an identification of a particular program associated with the tuning event and a household minutes value representing a number of minutes the particular program was played at a particular household in association with the tuning event;
accessing panelist viewing data representing viewing events associated with panelists, each viewing event in the panelist viewing data including an identification of a program associated with the viewing event and a panelist minutes value representing a number of minutes a panelist was exposed to the program during the viewing event;
determining, based on the panelist viewing data, a plurality of state values, each of the state values corresponding to a different portion of the program and representing whether the corresponding portion was watched by a given one of the panelists, wherein the plurality of state values comprise a state value indicating that a particular portion of the program was watched and another state value indicating that another particular portion of the program was not watched;
for at least one tuning event represented by the tuning data:

accessing household member data descriptive of one or more individual members of a household associated with the tuning event;

determining that at least a portion of the panelist viewing data, which includes information descriptive of the panelists, matches at least a portion of the household member data of the one or more individual members;

determining, for each of the one or more individual members of the household, a total number of watched portions and a total number of series of continuous portion-watching of the particular program identified by the at least one tuning event; and generating, based on the total numbers, an output representative of a probability that at least a portion of the particular program identified by the at least one tuning event was watched by at least one of the one or more individual members.

17. The non-transitory, computer-readable storage medium of claim 16, wherein the instructions when executed further cause the device to perform operations comprising determining, based on the plurality of state values, a number of transitions by the given one of the panelists between the watched state and the not watched state.

18. The non-transitory, computer-readable storage medium of claim 17, wherein the instructions when executed further cause the device to perform operations comprising determining, for each of the individual members of the household and based on the portion of the panelist viewing data, a probability that the individual member of the household will transition from the watched state to the not watched state.

* * * * *